United States Patent
Volke et al.

(10) Patent No.: US 12,323,052 B2
(45) Date of Patent: Jun. 3, 2025

(54) ACTIVE DISCHARGE OF AN ELECTRIC DRIVE SYSTEM

(71) Applicant: POWER INTEGRATIONS, INC., San Jose, CA (US)

(72) Inventors: Andreas Volke, Soest (DE); Vinzenz Maurer, Olten (CH); Salem Abid, Ipsach (CH); Douglas Arnold Erik Andersson Hagglund, Biel (CH); Michael Hornkamp, Ense (DE); Matthias Peter, Orpund Bern (CH)

(73) Assignee: POWER INTEGRATIONS, INC., San Jose, CA (US)

( * ) Notice: Subject to any disclaimer, the term of this patent is extended or adjusted under 35 U.S.C. 154(b) by 708 days.

(21) Appl. No.: 17/665,249

(22) Filed: Feb. 4, 2022

(65) Prior Publication Data
US 2022/0263404 A1 Aug. 18, 2022

(30) Foreign Application Priority Data
Feb. 18, 2021 (EP) .................... 21157852

(51) Int. Cl.
*H02M 1/32* (2007.01)
*B60L 3/00* (2019.01)
*B60L 3/04* (2006.01)

(52) U.S. Cl.
CPC ............ *H02M 1/322* (2021.05); *B60L 3/04* (2013.01); *B60L 3/0046* (2013.01)

(58) Field of Classification Search
CPC .... H02M 1/322; H02M 1/08; H02M 3/33573; H02M 3/01; H02M 7/5387; B60L 3/04;
(Continued)

(56) References Cited

U.S. PATENT DOCUMENTS 5,172,308 A * 12/1992 Tohya ............... H02M 3/33573
363/16
7,109,686 B2 9/2006 Schulte et al.
(Continued)

FOREIGN PATENT DOCUMENTS

CN 109600030 A 4/2019
DE 112011105295 B4 2/2017
(Continued)

OTHER PUBLICATIONS

European Patent Application No. 22157367.8; "European Search Report Mailed Jun. 10, 2022"; Jun. 10, 2022; 13 pages.
(Continued)

*Primary Examiner* — Stacy Whitmore (57) ABSTRACT

Systems, devices, and methods for active discharge of an electric drive system for a vehicle includes an inverter having at least one phase leg, wherein a first of the phase legs includes a first power switch, a dc/dc converter configured to generate an internal supply voltage that is regulated with respect to a voltage on a rail, and a gate drive channel configured to drive the first power switch into conductance by applying a relatively high voltage difference during operation of the vehicle and to continue the driving of the first power switch with a relatively lower voltage difference after a signal indicating shut-down or fault. The dc/dc converter is configured to generate the internal supply voltage to have either a relatively high voltage difference with respect to the voltage on the rail or a relatively lower voltage difference with respect to the voltage on the rail.

17 Claims, 6 Drawing Sheets

(58) Field of Classification Search
CPC ...... B60L 3/0046; B60L 1/00; B60L 2210/12; B60L 2210/40; B60L 15/007
See application file for complete search history.

(56) References Cited

U.S. PATENT DOCUMENTS

| | | | |
|---|---|---|---|
| 7,635,998 B1* | 12/2009 | Taki | H03K 17/04123 |
| | | | 327/108 |
| 8,022,569 B2 | 9/2011 | Chen et al. | |
| 8,039,993 B2 | 10/2011 | Kaplan | |
| 8,115,457 B2 | 2/2012 | Balakrishnan et al. | |
| 8,140,204 B2 | 3/2012 | Okubo et al. | |
| 8,299,730 B2 | 8/2012 | Gaknoki et al. | |
| 8,432,648 B2 | 4/2013 | Fukuyama et al. | |
| 8,610,382 B2 | 12/2013 | Goldammer et al. | |
| 9,018,865 B2* | 4/2015 | Meyer, III | H01M 10/44 |
| | | | 320/135 |
| 9,041,329 B2 | 5/2015 | Zhang et al. | |
| 9,043,066 B2 | 5/2015 | Kanzaki et al. | |
| 9,219,420 B1 | 12/2015 | Zhang et al. | |
| 9,548,675 B2 | 1/2017 | Schoenknecht | |
| 9,748,947 B1* | 8/2017 | Wagoner | H03K 17/168 |
| 9,954,461 B1 | 4/2018 | Duvnjak | |
| 10,183,555 B2 | 1/2019 | Sakai et al. | |
| 10,384,561 B2 | 8/2019 | Yang et al. | |
| 10,644,581 B2* | 5/2020 | El Markhi | H02M 3/1563 |
| 10,998,843 B2* | 5/2021 | Baeurle | H02M 1/08 |
| 11,437,911 B2* | 9/2022 | Duvnjak | H02M 3/156 |
| 12,081,139 B2* | 9/2024 | Jungkunz | H02M 7/4835 |
| 2006/0202636 A1 | 9/2006 | Schneider | |
| 2007/0182361 A1* | 8/2007 | Pande | H02P 1/029 |
| | | | 318/812 |
| 2010/0102638 A1* | 4/2010 | Chen | B60L 3/04 |
| | | | 307/100 |
| 2011/0080149 A1 | 4/2011 | Fukuta et al. | |
| 2013/0223104 A1* | 8/2013 | Tian | H02M 3/33576 |
| | | | 363/17 |
| 2014/0247000 A1 | 9/2014 | Schoenknecht | |
| 2016/0134187 A1 | 5/2016 | Pregitzer et al. | |
| 2017/0170715 A1 | 6/2017 | Sathik et al. | |
| 2017/0256971 A1 | 9/2017 | Namou et al. | |
| 2017/0257092 A1* | 9/2017 | Rossi | H03K 17/04123 |
| 2017/0305274 A1* | 10/2017 | Saha | B60L 3/003 |
| 2018/0079315 A1* | 3/2018 | Yang | H02M 7/5387 |
| 2018/0219546 A1 | 8/2018 | Yang et al. | |
| 2019/0295776 A1* | 9/2019 | Schiedermeier | H01G 4/012 |
| 2020/0067400 A1* | 2/2020 | Li | H02M 1/4216 |
| 2020/0339103 A1* | 10/2020 | Takahashi | B60L 3/04 |
| 2020/0395837 A1* | 12/2020 | Jeong | H02M 1/32 |
| 2022/0097632 A1* | 3/2022 | D'Angelo | H02M 1/0025 |
| 2022/0258610 A1* | 8/2022 | Volke | B60L 3/0023 |
| 2023/0318444 A1* | 10/2023 | Dick | H02J 7/0047 |
| | | | 320/166 |
| 2024/0088812 A1* | 3/2024 | El-Barbari | H02P 27/06 |
| 2024/0278648 A1* | 8/2024 | David | H05K 7/20927 |
| 2024/0305185 A1* | 9/2024 | D'Angelo | H03K 17/6871 |

FOREIGN PATENT DOCUMENTS

| | | |
|---|---|---|
| JP | 2008061300 A | 3/2008 |
| JP | 2009232620 A | 10/2009 |
| WO | 2014159456 A1 | 10/2014 |

OTHER PUBLICATIONS

European Application Serial No. 21157852.1; "Communication pursuant to Article 94(3) EPC"; Mailed Mar. 20, 2024; 7 pages.
European Application Serial No. 22157367.8; "Communication pursuant to Article 94(3) EPC"; Mailed Mar. 14, 2024; 7 pages.
European Patent Application No. 21157846.3; "European Search Report"; Oct. 14, 2021, 13 pages.
European Patent Application No. 21157852.1; "European Search Report"; Jul. 23, 2021, 11 pages.
Ke, Ziewei et al., "DC Bus Capacitor Discharge of Permanent Magnet Synchronous Machine Drive Systems for Hybrid Machine Drive Systems for Hybrid Electric Vehicles", IEEE 978-1-4673-9550-2/16, 2016, 6 pages.
U.S. Appl. No. 17/581,777; "Corrected Notice of Allowance"; mailed Sep. 25, 2024; 4 pages.
U.S. Appl. No. 17/581,777; "Non-Final Office Action"; mailed May 24, 2024; 6 pages.
U.S. Appl. No. 17/581,777; "Notice of Allowance": mailed Nov. 19, 2024; 7 pages.
U.S. Appl. No. 17/581,777; "Notice of Allowance"; mailed Dec. 27, 2024; 7 pages.
U.S. Appl. No. 17/581,777; "Notice of Allowance"; mailed Sep. 19, 2024; 7 pages.
European Patent Application 21157846.3; "Partial European Search Report"; mailed Sep. 9, 2021, 12 pages.

* cited by examiner

ACTIVE DISCHARGE OF AN ELECTRIC DRIVE SYSTEM

CROSS-REFERENCE TO RELATED APPLICATIONS

This application claims priority to European Patent Application No. 21157852.1, filed on Feb. 18, 2021. European Patent Application No. 21157852.1 is hereby incorporated by reference in their entirety.

TECHNICAL FIELD

This invention relates to the active discharge of an electric drive system.

BACKGROUND

Electric drive systems are found in electric vehicles such as, e.g., electric cars and trucks, hybrid electric cars and trucks, and electric trains and trams. Electric vehicles generally include an inverter that converts a battery or other dc output into an ac signal for driving an electric motor. In these vehicles, a relatively large and high current capacity energy storage capacitance is commonly used as an intermediate buffer between the battery and the inverter. These capacitances can be referred to as "DC link capacitors" or "smoothing capacitors." These capacitances smoothen the input voltage, provide low-inductive current paths to the inverter output stage, and to store energy.

An electric drive system in a battery-powered electric vehicle will typically be shut down several thousand times over its operational lifespan. During a shutdown, the battery is isolated from the rest of the electric drive system. However, without further measures, the intermediate DC link capacitor will retain a charge after being disconnected from the battery. For safety reasons, regulatory agencies often require that this charge be dissipated reasonably soon after shut down. For example, a typical regulatory requirement would have the DC link capacitor discharged within 2 seconds to a voltage below 60 volts.

In some cases, a discharge switch and a resistor can be coupled across the DC link capacitor. After disconnection from the battery, this discharge switch is switched into conduction and the DC link capacitor is discharged through the resistor.

DESCRIPTION OF DRAWINGS

Non-limiting and non-exhaustive embodiments of the present invention are described with reference to the following figures, wherein like reference numerals refer to like parts throughout the various views unless otherwise specified.

Like reference symbols in the various drawings indicate like elements.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As discussed above, regulatory agencies often require that the charge retained on a DC link capacitor after disconnection be dissipated reasonably soon after shut down.

In embodiments of the present disclosure, one or more of the power switches that drive the electric motor can be used to discharge the DC link capacitor. The amount of current conducted by the power switch is responsive to the difference between a control terminal voltage and a reference terminal voltage of the power switch. A gate drive unit controls the voltage difference between a control terminal and a reference terminal to turn ON and OFF the power switch and discharge the DC link capacitor. In embodiments, the difference between the control terminal voltage and the reference terminal voltage may be varied to control current conduction by the power switch during discharge the DC link capacitor.

Figure 1:
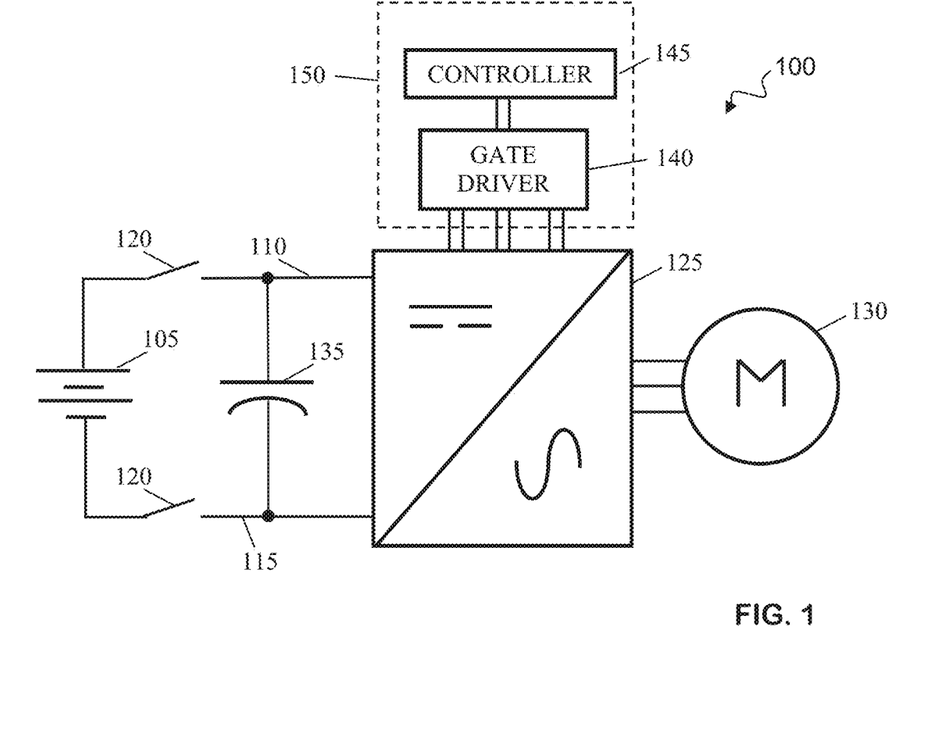
FIG. 1 is a schematic representation of an electric drive system.

FIG. 1 is a schematic representation of an electric drive system 100. Drive system 100 includes a battery 105 reversibly coupled between a high rail 110 and a low rail 115 by a switch 120. Drive system 100 also includes an inverter 125, an electric motor 130, and a gate drive channel 150. In operation, under the direction of gate drive channel 150, inverter 125 converts the dc voltage supplied by battery 105 into an ac voltage and supplies electric motor 130 with power. A DC link capacitor 135 is coupled between rails 110, 115. When battery 105 is decoupled from rails 110, 115 by switch 120, DC link capacitor 135 is discharged through inverter 125.

In more detail, switches 120 are typically mechanical switches and coupled to connect and disconnect battery 105 from rails 110, 115. Under normal conditions, battery 105 will be connected to rails 110, 115 when the vehicle that includes drive system 100 is in operation, e.g., moving or ready to move. Battery 105 will be disconnected from rails 110, 115 during shut-off or in the event of a sufficiently severe fault condition.

Upon connection of battery 105 to rails 110, 115, both DC link capacitor 135 and inverter 125 will be biased by battery 105. The voltage developed across DC link capacitor 135 will tend towards equality with the voltage provided by battery 105. However, deviations from equality will occur since DC link capacitor 135 accepts and provides charge more quickly than battery 105. In addition, the DC link capacitor 135 is generally placed closer to the power switches of inverter 125 and at some distance from the battery 105. The cable inductance can lead to high transient voltage events. DC link capacitor 135 thus acts to smooth the voltage between rails 110, 115 across inverter 125.

Inverter 125 can include a collection of phase legs that are each formed by a pair of switching devices coupled in series between rails 110, 115. In general, the switching devices will be insulated-gate bipolar transistors (IGBT) or other power semiconductor devices. Other power semiconductor devices could include transistors such as a gallium nitride (GaN) based transistor, silicon (Si) based transistor, or silicon carbide (SiC) based transistor. Other transistors such as a metal-oxide-semiconductor field-effect transistor (MOSFET) or a bipolar junction transistor (BJT) may also be used. The switching of the switching devices is driven by gate driver circuitry 140 under the control of a controller 145. Gate driver circuitry 140 is configured to appropriately bias the switching devices in inverter 125 in accordance with control signals received from controller 145. Controller 145 is configured to generate the control signals in response to higher level control signals. Example of higher level control signals include, e.g., an indication that the vehicle's velocity is to be increased or decreased. In some implementations, the control signals from controller 145 can specify the switching pattern to be used by gate driver circuitry 140 to bias the switching devices in inverter 125. For example, the control signals from controller 145 can be a pulse-width modulated switching pattern that is converted by gate driver circuitry 140 into a signal that is suitable for driving the switching devices in inverter 125. In other implementations, the control signals generated by controller 145 are higher level and used by gate driver circuitry 140 to generate a switching pattern. Controller 145 can be implemented, e.g., as a microcontroller that is disposed on the same printed circuit board (PCB) as gate driver circuitry 140. In other embodiments, controller 145 can be implemented as a microcontroller disposed on a separate PCB than the gate driver circuitry 140. Like inverter 125, gate driver circuitry 140 may be referenced to rail 115. Controller 145 can also be referenced to rail 115, can be referenced to another voltage, or can include some components that are referenced to rail 115 and other components that are referenced to another voltage.

In any case, gate driver circuitry 140 and controller 145 can be considered to be part of a gate drive channel 150 that controls the provision of power to electric motor 130 by appropriately driving switches in inverter 125. As discussed further below, controller 145 can also control the switching of one or more of the switching devices in inverter 125 to discharge DC link capacitor 135 when battery 105 is decoupled from rails 110, 115 by switch 120.

Figure 2:
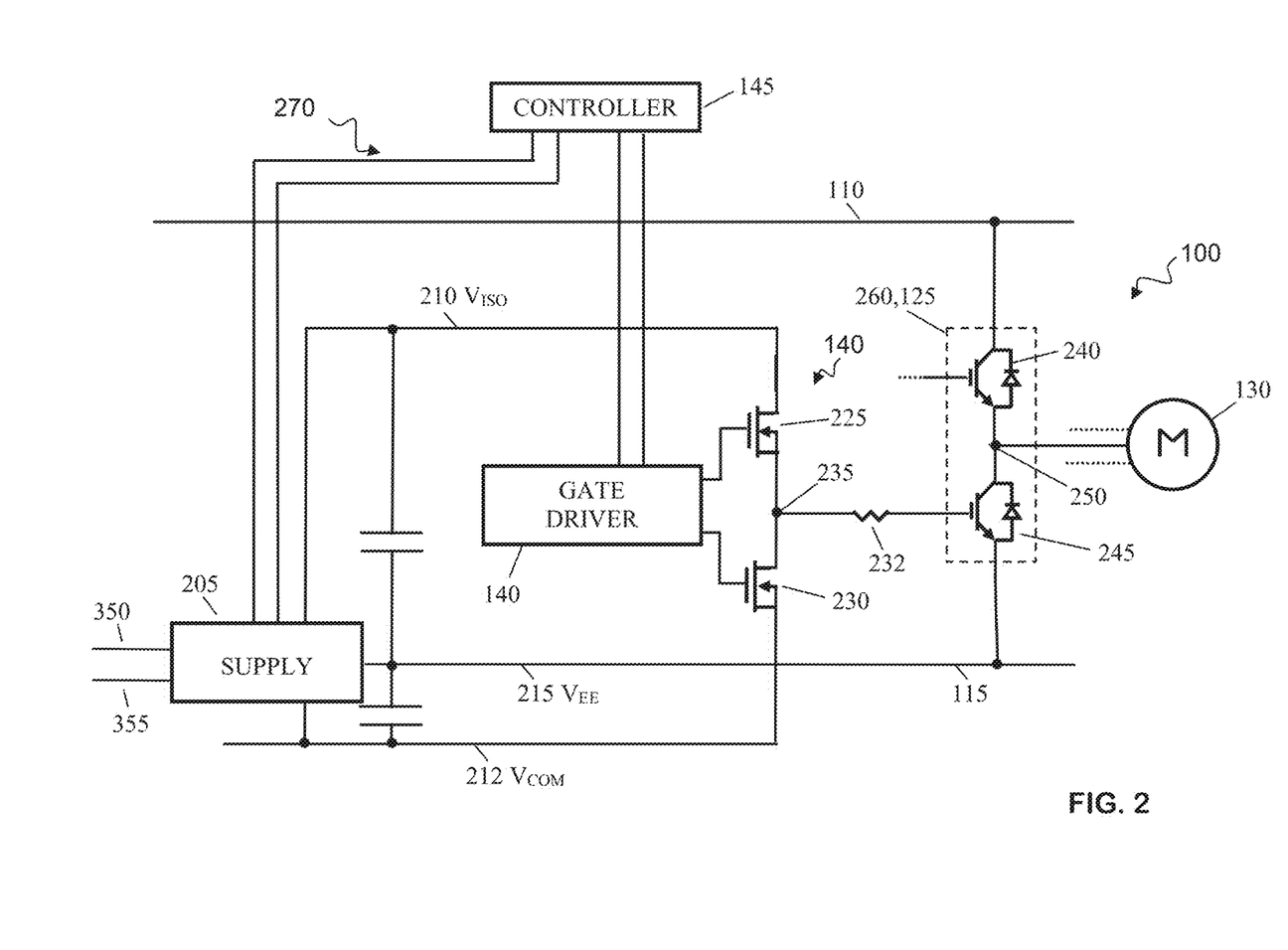
FIG. 2 is a schematic representation of the portion responsible for controlling the provision of power to an electric motor via a single phase leg in the electric drive system of FIG. 1.

FIG. 2 is a schematic representation of a portion of the circuitry in electric drive system 100, namely, a portion responsible for controlling the provision of power to electric motor 130 via a single phase leg.

In more detail, electric drive system 100 includes a supply 205. In general, supply 205 is configured to generate an internal supply voltage (i.e., $V_{ISO}-V_{COM}$) between its output rails 210, 212. As shown, supply 205 receives input rails 350, 355 to generate output rails 210, 212. In some implementations, high rail 110 and low rail 115 can act as input rails 350, 355, although this is not necessarily the case. For example, with reference to DIN 72552, contacts 30/31 can be coupled to input rails 350, 355.

In the illustrated low side portion of electric drive system 100, an intermediate output with a voltage $V_{EE}$ that is in a range between $V_{ISO}$ and $V_{COM}$ is tied to low rail 115 of battery 115. As an aside, in a corresponding high side portion of electric drive system 100 which controls the switching of IGBT 240, the intermediate output of a second supply regulator will be tied to an intermediate node in phase leg 260 of inverter 125, i.e., output node 250.

Returning to the illustrated low side portion of electric drive system 100, in one example with the intermediate output 215 of supply 205 tied to low rail 115, voltage $V_{ISO}$ 210 is in a voltage range suitable to drive power switch 245 and referenced to rail 115 Further, voltage $V_{COM}$ 212 is selected to accommodate the turn-off gate voltage of IGBT 245. In one example voltage $V_{COM}$ 212 is low with respect to the voltage on rail 115. In another embodiment, voltage $V_{COM}$ 212 may be substantially equal to voltage $V_{EE}$ 215. By virtue of the conversion performed by supply 205, the voltage differences between high supply rail 210 $V_{ISO}$, low supply rail 212 $V_{COM}$, and intermediate output 215 $V_{EE}$ can be fairly constant even in the face of changes of load conditions during operation of the vehicle. These load condition include the speed of the vehicle and can be reflected in the switching frequency of power switch 245. Further, the magnitude of the voltage differences between $V_{ISO}$, $V_{EE}$, and $V_{COM}$ are selected to provide working the turn-on and turn-off voltages for IGBT 245. Further, $V_{ISO}$, $V_{EE}$, and $V_{COM}$ can be utilized to provide working supply voltages to internal circuitry of gate driver 140. For example, the voltage difference between $V_{ISO}$ and $V_{COM}$ can be between 15-30 V (e.g., 20 Volts). During vehicular driving, the voltage difference between $V_{EE}$ and $V_{COM}$ can be, e.g., 0-10 volts (e.g., 5 volts) so that the voltage $V_{COM}$ on rail 212 is equal to or below the voltage on low rail 115.

As discussed further below, the voltage difference between rails 210, 212 can be changed to discharge DC link capacitor 135 when battery 105 is decoupled from rails 110, 115. The change can be implemented by supply 205 under the direction of controller 145. To this end, controller 145 is coupled to supply 205 by one or more signal lines 270 by which, e.g., controller 145 can signal initiation of the active discharge mode to supply 205 and supply 205 can provide information to controller regarding changes in the voltage difference between rails 210, 212.

Amongst the circuitry in drive system 100 that rails 210 and 212 supply is at least a portion of gate drive channel 150. The illustrated implementation of a portion of gate drive channel 150 includes a gate driver 140, a pull up transistor 225, a pull down transistor 230, and a single gate resistor 232. Gate driver 140 is configured to receive control signals and controls transistors 225, 230 in accordance with those control signals. Pull up transistor 225 is coupled between high supply rail 210 and an output node 235 of the gate drive channel. Pull down transistor 230 is coupled between output node 235 and low rail 212. Gate resistor 232 conducts drive signals from output node 235 to IGBT 245.

Other implementations of this portion of gate drive channel 150 are possible. For example, rather than including output node 235, the gate of IGBT 245 can be pulled up and down using different channels that each include one transistor and one gate resistor and alternatively couple the gate of IGBT 245 to a respective rail.

The illustrated portion of electric drive system 100 also includes a single phase leg 260 of inverter 125. Phase leg 260 includes a pair of IGBTs 240, 245 coupled in series between positive rail 110 and low supply rail 115. An output node 250 of inverter 125 is between IGBTs 240, 245 and reversibly coupled to a single one of either positive rail 110 or low supply rail 115 when a respective one of IGBTs 240, 245 is switched into conduction.

Note that the control terminal (i.e., gate) of each IGBT 240, 245 is coupled to a respective portion of gate drive channel 150, although only the coupling of IGBT 245 is shown in the schematic illustration. Further, inverter 125 includes additional phase legs (e.g., 3 or 4 phase legs in toto).

In operation, gate driver 140—in conjunction with other portions of gate drive channel 150—will coordinate the switching of IGBTs 240, 245 and other switches in other legs of inverter 125 in order to power motor 130. When IGBT 245 is to be biased into conduction, pull down transistor 230 is driven into a non-conductive state by gate driver 140 and pull up transistor 225 is driven into a conductive state. Conduction through pull up transistor 225 biases IGBT 245 positively with respect to low supply rail 215 and into conduction. Current can flow through motor 130 and IGBT 245 to low supply rail 115. When IGBT 245 is to be biased into non-conduction, pull up transistor 225 is driven into a nonconductive state and pull down transistor 230 is driven into a conductive state by gate driver 140. Conduction through pull down transistor 230 biases the gate of IGBT 245 negatively with respect to low supply rail 115 and out of conduction. Since supply 205 supplies the voltages $V_{ISO}$, $V_{EE}$, $V_{COM}$, low rail 212 can negatively bias the gate of IGBT 245 and ensure a proper shut-off. However, as discussed above, in alternative implementations the voltage on rail 215 can be substantially equal to the voltage on rail 212.

For example, assume that, during vehicular operation, supply 205 supplies a voltage difference of 20 Volts between $V_{ISO}$ of rail 210 and $V_{COM}$ of rail 212 with $V_{EE}$ about 5 volts above $V_{COM}$. The voltage difference between $V_{ISO}$ and $V_{EE}$ is thus approximately 15 Volts. With pull down transistor 230 in conduction and pull up transistor 225 not conducting, the gate of IGBT 245 will be biased to five volts below $V_{EE}$—and hence below the emitter of IGBT 245. Turn-off of IGBT 245 is insured. With pull up transistor 225 in conduction and pull down transistor 230 not conducting, the gate of IGBT 245 will be biased 15 volts positively with respect to $V_{EE}$—and 15 volts above the emitter of IGBT 245. Turn-on of IGBT 245 is insured and IGBT 245 will conduct with a given transconductance.

Figure 3:
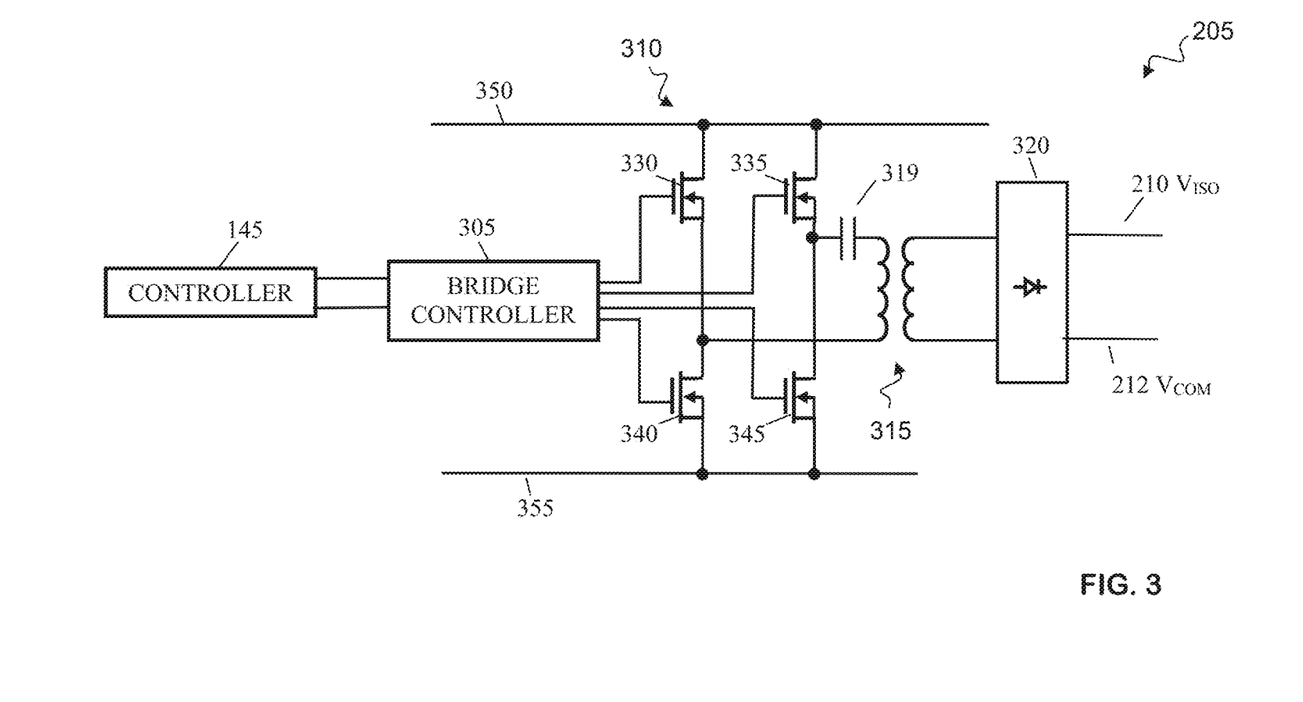
FIG. 3 is a schematic representation of a supply regulator and the coupling between supply regulator and the controller of FIG. 1.

FIG. 3 is a schematic representation of an implementation of a portion of supply 205 and the coupling between supply 205 and controller 145. The illustrated implementation of supply 205 is a full bridge dc/dc converter and includes a bridge controller 305, a transistor bridge 310, a transformer 315, a capacitor 319 and a rectifier 320. In particular, the supply 205 is shown as a full bridge LLC converter. Other dc/dc converter topologies are possible. Regardless of the particular dc/dc converter topology, supply 205 supplies an internal supply voltage $V_{ISO}$–$V_{COM}$ between high supply rail 210 and low rail 212. In some implementations, the internal supply voltage $V_{ISO}$–$V_{COM}$ may be regulated, although this is not necessarily the case. As an aside, the voltage $V_{EE}$ at intermediate output 215 (not shown) can be set between voltages $V_{ISO}$, $V_{COM}$ in a number of different ways including, e.g., a voltage divider that includes resistors, Zener diodes, and/or other elements coupled between rails 210, 212. In more detail, transistor bridge 310 includes transistors 330, 335, 340, 345 coupled between a pair of dc supply rails 350, 355. DC supply rails 350, 355 supply dc voltage at a level such that, given the turns ratio of transformer 315, bridge controller 305 can generate internal supply voltage difference $V_{ISO}$–$V_{COM}$ between high supply rail 210 and low rail 212 using transistor bridge 310 as a full bridge, e.g., in a voltage-mode control scheme. In one embodiment, bridge controller 305 and transistors 330, 335, 340, 345 may be formed as part of an integrated circuit that is manufactured as either a hybrid or monolithic integrated circuit. As shown, transistors 330, 335, 340, 345 are illustrated as n-type MOSFETs, however it should be appreciated that other transistors may be utilized.

In using bridge 310 as a full bridge, bridge controller 305 can switch transistors 335, 340 into conduction while maintaining transistors 330, 345 in a non-conductive state. This configuration applies the voltage difference between rails 350, 355 minus the voltage across capacitor 319 across an input winding of transformer 315. In other words, the voltage across the input winding is the voltage on rail 350 minus the voltage on rail 355 minus the voltage across capacitor 319 (assuming that the voltage drops across the switches are negligible). Later, bridge controller 305 can switch transistors 335, 340 into a non-conductive state and switch transistors 330, 345 into conduction. This configuration applies the voltage difference between rails 355, 350 minus the voltage across capacitor 319 across the input winding. In other words, the voltage across the input winding becomes the voltage on rail 355 minus the voltage on rail 350 minus the voltage across capacitor 319 (again assuming the voltage drops across the switches are negligible). An alternating current series of positive and negative pulses is thus applied across the input winding and converted into corresponding ac signal on the output winding of transformer 315 according to the turns ratio and polarity of the windings. Rectifier 320 rectifies the ac signal on the output winding to generate an internal supply voltage difference $V_{ISO}$–$V_{COM}$ between high supply rail 210 and low rail 212.

Controller 145 is also configured to signal to bridge controller that DC link capacitor 135 is to be discharged. In response, bridge controller 305 can use bridge 310 as a half bridge. For example, bridge controller 305 can maintain one of transistors 330, 335, 340, 345 in conduction and another out of conduction while alternatively switching whichever of transistors 330, 335, 340, 345 are connected to the other terminal of the input winding of transformer 315.

By way of example, suppose bridge controller 305 maintains transistor 340 in conduction and transistor 330 non-conductive. When transistor 345 is in a nonconductive state and transistor 335 is in a conductive state, the voltage difference between rails 350, 355 minus the voltage across the capacitor 319 is applied across the input winding of transformer 315. In other words, the voltage across the input winding is the voltage on rail 350 minus the voltage on rail 355 minus the voltage across the capacitor 319. In half-bridge configuration, the voltage across the capacitor 319 and the inductor of transformer 315 settles to about half the voltage difference between rails 350, 355. This leads to a reduced voltage across the input winding of transformer 315 and a smaller difference generated between high supply rail 210 and low rail 212. In contrast, when transistor 335 is in a nonconductive state and transistor 345 is in a conductive state, no voltage difference is applied across the capacitance and the input winding of transformer 315. As such, positive pulses are converted into corresponding ac signal on the output winding of transformer 315 and, after rectification by rectifier 320, a smaller difference is generated between high supply rail 210 and low rail 212. In other words, the reduced voltage across the input winding of transformer 315 leads to a smaller difference generated between high supply rail 210 and low rail 212.

As discussed above, controller 145 can direct gate driver 140 to coordinate the switching of the switches in the legs of inverter 125 in order to power motor 130. However, controller 145 can also control gate driver 140 to coordinate the switching of the switches in the legs of inverter 125 to actively discharge DC link capacitor 135 (FIG. 1).

Referring again to FIG. 2, when IGBT 245 is to be switched into or out of conduction, alternating conduction through pull up transistor 225 and pull down transistor 230 biases the gate of IGBT 245 positively or negatively with respect to low supply rail 115. The magnitude of the bias is the voltage difference between $V_{ISO}$ and $V_{EE}$ or the voltage difference between $V_{EE}$ and $V_{COM}$.

When bridge controller 305 uses bridge 310 as a half bridge, voltage difference between $V_{ISO}$ and $V_{COM}$ decreases. The voltage $V_{COM}$ on low rail 212 remains below $V_{EE}$ and the gate of IGBT 245 is still negatively biased for effective turn-off. However, the voltage difference between $V_{ISO}$ and $V_{EE}$—which is the voltage between the gate and the emitter of the IGBT (i.e., $V_{GE}$)—changes the output characteristic of IGBT 245 so that the impedance of IGBT 245 increases and the current carried through IGBT 245 decreases.

This change in the output characteristic of IGBT 245 can be used to actively discharge DC link capacitor 135 without damage to IGBTs 240, 245. In particular, as discussed above, DC link capacitor 135—and rails 110, 115—will retain a high voltage after being disconnected from the battery. If IGBTs 240, 245 were driven with a high transconductance to discharge this high voltage, this could approximate a short circuit. The current could be relatively high and could damage IGBTs 240, 245. In contrast, by driving at least one of IGBTs 240, 245 with a relatively lower voltage difference between $V_{ISO}$ and $V_{EE}$ and lower transconductance, the current can be maintained sufficiently low to avoid damage.

Please note that a variety of different approaches can be used to tailor the net impedance across phase leg 260 to actively discharge DC link capacitor 135. For example, IGBT 240 can be kept conductive while IGBT 245 is actively switched with a relatively low transconductance and higher impedance output characteristic, IGBT 245 can be kept conductive while IGBT 240 is actively switched with a relatively low transconductance, or both IGBTs 240, 245 can be actively switched, where at least one has a relatively low transconductance.

If both IGBTs 240, 245 are actively switched, their switching will generally be synchronized so that IGBTs 240, 245 open and close in unison. However, this is not necessarily the case. For example, IGBT 240 could begin transitioning into a more conductive ON state (i.e., a state that has either a relatively high or low transconductance) while IGBT 245 initially remains non-conductive. IGBT 245 can begin transitioning into a more conductive state either some time during or after IGBT 240's ON state transition to further tailor the next impedance across phase leg 260 to operational conditions. It is only necessary that a current flow path be formed between rails 110, 115 with a relatively low transconductance.

Further, lest any doubt remain, other phase legs in an inverter 125 can correspondingly participate in the active discharge. In any case, with at least one IGBT acting as a more resistive element, a short circuit between rails 110, 115 is avoided. However, that IGBT still provides a current flow pathway for active discharge of DC link capacitor 135.

Further, as discussed below, the switching pattern of one or both of IGBTs 240, 245 during active discharge can be specified by controller 145, gate drive 140, or both controller 145 and gate drive 140.

Figure 4:
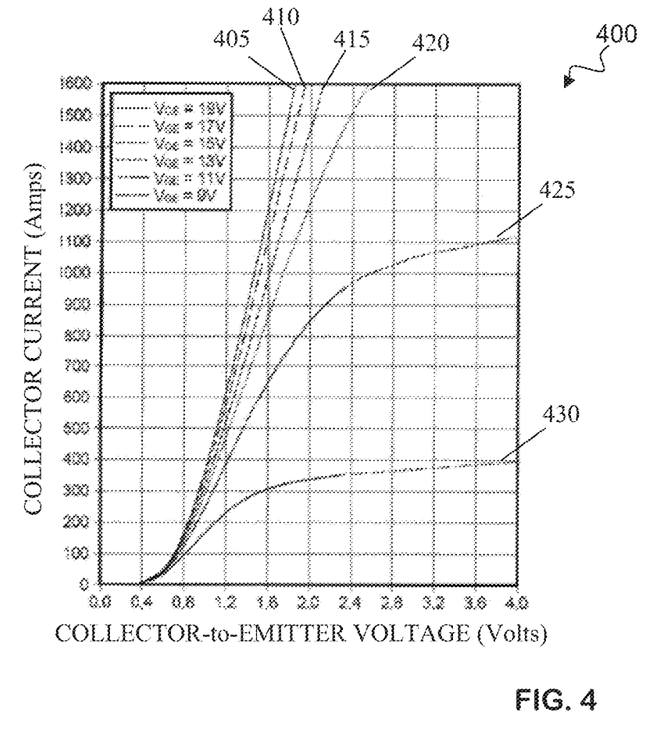
FIG. 4 is a graph that represents the output characteristics of an IGBT that is suitable for use in an inverter in an electric vehicle drive system.

FIG. 4 is a graph 400 that represents the output characteristics of an IGBT that is suitable for use in an inverter in an electric vehicle drive system, e.g., as IGBT's 240, 245. Position along the x-axis in graph 400 denotes the voltage difference between the collector and the emitter (i.e., $V_{CE}$) of the IGBT in volts. Position along the y-axis denotes the collector current (i.e., $I_C$) in amperes. The different curves 405, 410, 415, 420, 425, 430 are each associated with a different voltage between the gate and the emitter of the IGBT (i.e., $V_{GE}$). For example, curve 405 shows the relationship between $V_{CE}$ and $I_C$ when $V_{GE}$ is 19 Volts, curve 410 shows the relationship between $V_{CE}$ and $I_C$ when $V_{GE}$ is 17 Volts, curve 415 shows the relationship between $V_{CE}$ and $I_C$ when $V_{GE}$ is 15 Volts, curve 420 shows the relationship between $V_{CE}$ and $I_C$ when $V_{GE}$ is 13 Volts, curve 425 shows the relationship between $V_{CE}$ and $I_C$ when $V_{GE}$ is 11 Volts, and curve 430 shows the relationship between $V_{CE}$ and $I_C$ when $V_{GE}$ is 9 Volts. As shown, as $V_{GE}$ decreases, the slope of curves 405, 410, 415, 420, 425, 430 decreases and the resistance of the IGBT increases.

In general, graphs like graph 400 are provided by the supplier of an IGBT can be readily used to tailor the voltages and the values of different components to a particular set of operational circumstances.

Figure 5:
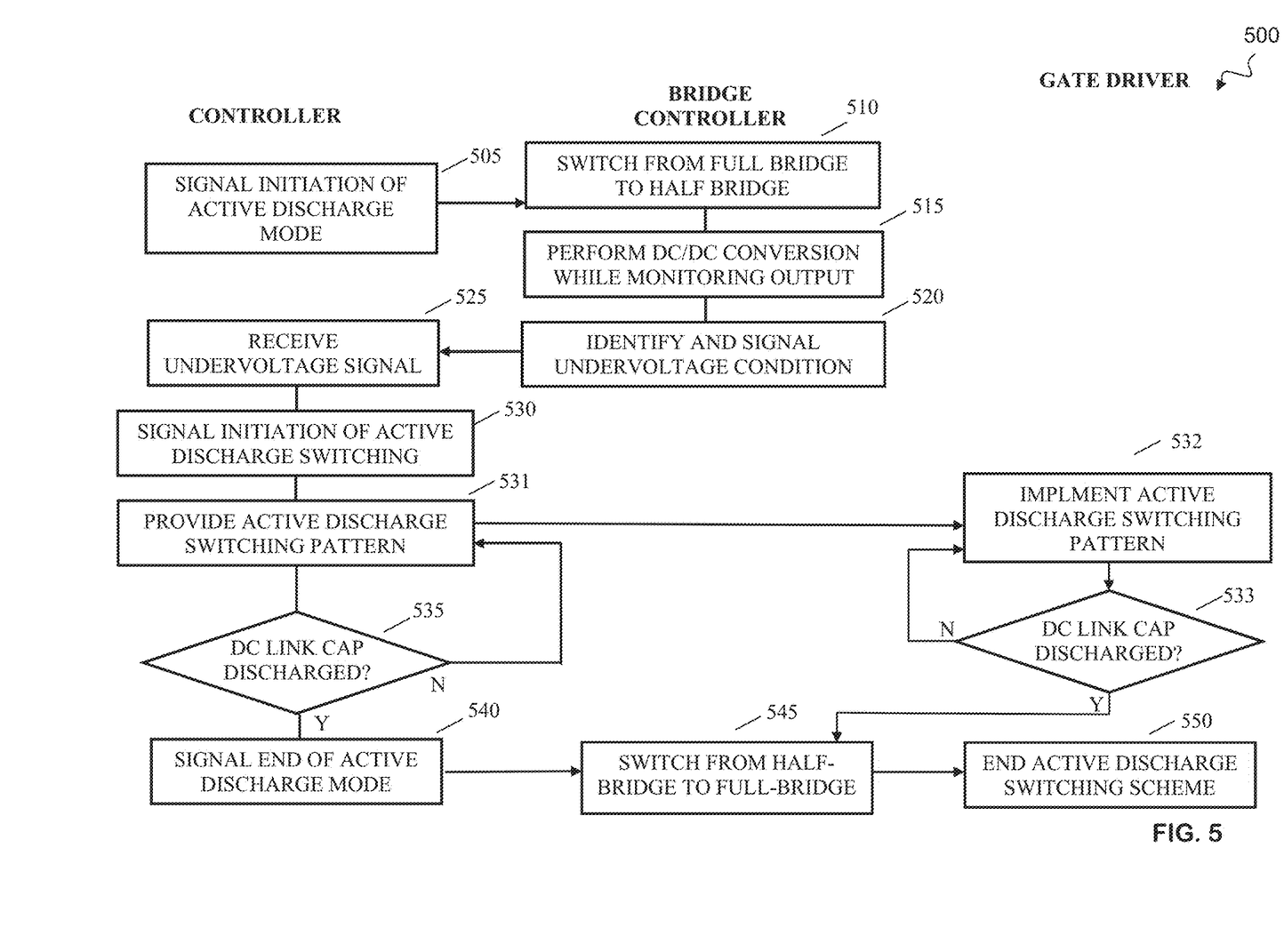
FIG. 5 is a swim lane diagram that schematically represents a process for active discharge of a DC link capacitor.

FIG. 5 is a swim lane diagram that schematically represents a process 500 for active discharge of a DC link capacitor. In the context of the electric drive system described above, the actions in the controller lane can be performed by controller 145, the actions in the bridge controller lane by bridge controller 305, and the actions in the gate driver lane by gate driver 140. Although process 500 can be performed in the context of these particular components, process 500 can also be adapted to other electric drive systems. For example, in some implementations, a single physical device may provide the functionality attributed to different controllers. For example, a bridge controller and a gate driver can be implemented in a single printed circuit board. Nevertheless, the processes and/or logic can be considered individually.

In process 500, the controller can signal initiation of an active discharge mode at 505. The controller can signal the initiation of the active discharge mode in response to one or more higher level signals, e.g., a signal indicating that operation of the device is to end or signal(s) indicating that a sufficiently severe fault condition has arisen. The initiation of the active discharge mode can be signaled in a number of different ways. For example, a signal on a dedicated active discharge terminal can indicate the initiation.

As discussed above, in some implementations, the control signals from a controller can specify the switching pattern to be used by the gate driver to bias the switching devices in an inverter. In these implementations, such control signals are terminated prior to initiation of an active discharge mode. In some implementations, termination of the switching pattern can signal the initiation of the active discharge mode.

In some implementations, the bridge controller and the gate driver can be implemented in a single physical device, e.g., they can be implemented on a single gate drive printed circuit board. In another implementation, the bridge controller and the gate driver may be formed as part of an integrated circuit that is manufactured as either a hybrid or monolithic integrated circuit. In such cases, initiation of the active discharge mode can be signaled using the same terminals that carry the control signals that specify how the switching devices in the inverter are to be biased. For example, after a suitable absence of control signals, a specialized active discharge mode initiation signal can be sent by the controller to the combined bridge controller/gate driver device.

In response to receipt of the signal indicating initiation of the active discharge mode, the bridge controller can switch from a full-bridge to half bridge driving of a transistor bridge at 510. As discussed above, this will lead to a decrease in the output voltage of the dc/dc converter. The bridge controller can continue to drive the transistor bridge as a half bridge at 515. In one example, the bridge controller can drive the transistor bridge as a half bridge while monitoring the output of the dc/dc converter. This monitoring can rely upon components in the dc/dc converter that participate in output regulation, i.e., no additional components or modification of the dc/dc converter are needed.

Further, at 520, the bridge controller can identify an undervoltage condition on the dc/dc converter output. In general, dc/dc converters will monitor for an undervoltage condition even without the need to actively discharge a DC link capacitor. This is done to identify a potential fault condition and ensure appropriate operation of the electric drive system. In some implementations, this same functionality can be relied upon in the active discharge mode and no additional components or modification of the dc/dc converter are needed. Although the time required for the output voltage of the dc/dc converter to fall below an undervoltage threshold may vary amongst different dc/dc converters, typically the fall will require between 1 and 10 milliseconds.

At 525, the controller 145 receives the signal indicative of the undervoltage condition. In response, the controller signals initiation of the active discharge switching to the gate drive at 530. As discussed above, in some implementations, the control signals from a controller can specify a particular switching pattern to be used by gate driver circuitry. In such implementations, the controller can signal initiation of active discharge by transmitting an active discharge switching pattern. For example, the active discharge switching pattern can be a series of pulse-width modulated pulses. The pulses for active discharge may be higher frequency/shorter duration than pulses in the switching patterns used during operation of the vehicle.

As another example, in some implementations, the control signals generated by controller 145 are higher level and used by gate driver circuitry 140 to generate an active switching pattern during active discharge.

As yet another example, in some implementations, the active discharge switching pattern is determined in part by controller 145 and in part by gate driver circuitry 140. For example, controller 145 can transmit indications of when one or both of IGBTs 240, 245 are to switch into conduction without associated indications of when the IGBT(s) 240, 245 is to switch out of conduction. Rather, the timing when the IGBT(s) 240, 245 is to switch out of conduction can be determined by gate driver circuitry 140.

In some implementations, desaturation protection functionality in gate driver circuitry 140 can be used to specify when IGBT(s) 240, 245 is/are to be switched out of conduction. In this context, desaturation protection is functionality implemented by gate driver circuitry to protect driven switches (e.g., IGBTs 240, 245) from currents that could, e.g., damage the device. An overcurrent or short circuit is detected in the protected device and the device is switched out of conduction in response. It is generally important that the device be switched out of conduction as quickly as possible. To this end, desaturation protection is commonly implemented by gate driver circuitry that is directly coupled to the device and that can respond without delays.

In the present context of active discharge, gate driver circuitry 140 can implement desaturation protection and monitor the voltage across one or both of IGBTs 240, 245. Typically, driver circuitry 140 compares the voltage across one or both IGBT 240, 245 with a threshold to determine whether a desaturation or short-circuit condition exists. If the voltage across IGBT 240, 245 is greater than the threshold, the gate driver circuitry triggers protection of the IGBT and turns the IGBT off. This process can be used during active discharge to specify when IGBT(s) 240, 245 is/are to be switched out of conduction. In particular, the gate driver circuitry 140 turns off IGBT(s) 240, 245 in response to detection of the desaturation/short-circuit condition.

This approach can provide some advantages. For example, desaturation protection functionality is generally already present in modern gate driver circuitry. Further, because desaturation protection relies on sensing currents or voltages within the driven switch, defining a portion of the active discharge switching pattern using desaturation protection inherently tailors the active discharge switching pattern not only to the driven switch but also to its operational state (e.g., temperature). In any case, the process also continues to block 532, in which the gate driver implements the active discharge switching pattern by driving turn on and turn off of transistors in accordance with the active discharge switching pattern.

Either or both of the controller and the gate driver can monitor the voltage across the DC link capacitor during active discharge. At 535, it will be determined that the DC link capacitor has been sufficiently discharged. If the DC link capacitor has not been sufficiently discharge, controller 145 continues providing the active discharge switching pattern. If the DC link capacitor has been sufficiently discharged, an end to the active discharge mode will be signaled at 540. In the illustrated implementation, the controller determines that the DC link capacitor has been sufficiently discharged and signals the end to the active discharge mode to both the bridge controller and the gate driver. In implementations in which the gate driver determines that the DC link capacitor has been sufficiently discharged, the gate driver signals the end to the active discharge mode to the bridge controller and the controller. In either case, the active discharge switching scheme at 550 is ended. Once the active discharge scheme is ended, at block 545 the bridge controller can switch from half bridge to full bridge for dc/dc conversion and generation of $V_{ISO}$-$V_{COM}$ and the gate driver ends the control of the turn-on and turn-off transistors per the active discharge switching scheme.

Figure 6:
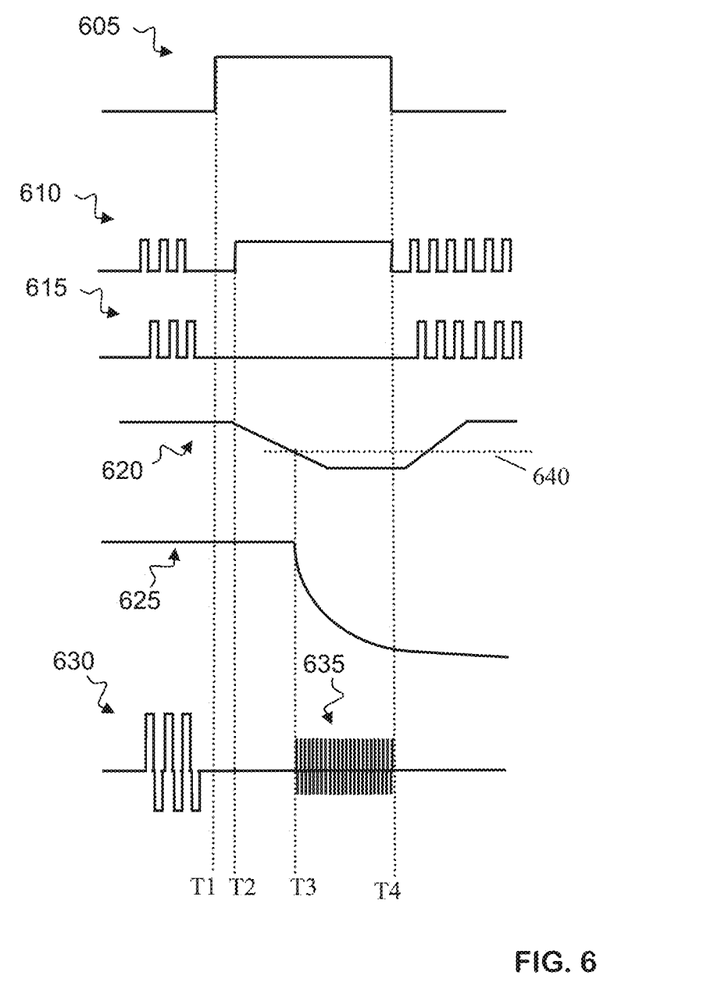
FIG. 6 is a schematic representation of different waveforms in the electric drive system of FIG. 1.

FIG. 6 is a schematic representation of different waveforms in an electric drive system 100. The waveforms are all presented as a function of time and span a window during which the voltage across DC link capacitor 135 is actively discharged. For example, the waveforms can span a short window during and shortly after shut down or a response to a sufficiently severe fault condition.

Waveform 605 represents the signal that initiates and ends active discharge mode. In the context of FIG. 2, active discharge control signal(s) can be sent from controller 145 to supply 205, e.g., over a communication line dedicated to carrying signal(s) that initiate and end the active discharge mode. Waveforms 610, 615 represent the voltage applied by a bridge controller to the control terminals of two of the transistors in a transistor bridge which is both a full bridge (before T2) and a half-bridge (between T2 and T4) operation. Waveform 620 represents the voltage difference between the voltage at high supply rail $V_{ISO}$ 210 and the voltage $V_{COM}$ at low rail 212. Waveform 625 represents the voltage across DC link capacitor 135. Waveform 630 represents the drive voltage applied to the control terminal of IGBT 245 (or other IGBT that participates in active discharge of DC link capacitor 135).

Prior to time T1, waveform 605 indicates that the bridge controller is to operate the bridge as a full bridge, i.e., outside of active discharge mode. Consequently, the bridge controller operates the transistors in the transistor bridge as a full bridge. For example, waveform 610 can represent the drive signal applied to the control terminal of transistor 335 and waveform 615 can represent the drive signal applied to the control terminal of transistor 345. Transistors 335, 345 are switched into and out of conduction in alternation and participate in generating an ac signal across transistor 315. A regulated, and relatively high, voltage difference is generated between the voltage at high supply rail $V_{ISO}$ 210 and the voltage $V_{COM}$ at low rail 212, as shown in waveform 620. The gate-to-emitter voltage of IGBT 245 (or other IGBT that participates in active discharge of DC link capacitor 135) is pulled up and down in in succession, as shown in waveform 630. As shown, the driving of IGBT 245 need not be continuous. For example, motor 130 need not be driven when the electric vehicle is "idling."

At time T1, controller 145 initiates the active discharge mode, e.g., by transitioning waveform 605 into a high state. In the illustrated implementation, controller 145 holds waveform 605 in the high state throughout the entire active discharge mode. Other conventions for signaling the initiation and end of the active discharge mode are possible.

After a delay, the bridge controller begins operating the bridge as a half bridge, i.e., in active discharge mode. The transistor in the bridge driven by waveform 610 is held in conduction whereas the transistor driven by waveform 615 is held out of conduction. The other transistors in the bridge can be alternatively switched in a manner akin to the switching on waveforms 610, 615 before T1.

In response to the switch to operation as a half bridge, the magnitude of the voltage generated by the dc/dc converter (i.e., the voltage difference between the voltage at high supply rail $V_{ISO}$ 210 and the voltage $V_{COM}$ at low rail 212) decreases. This also decreases the voltage difference between the voltage at high supply rail $V_{ISO}$ 210 and the voltage $V_{EE}$ at intermediate output 215, i.e., the gate-to-emitter voltage of the voltage of IGBT 245 or other IGBT that participates in active discharge of DC link capacitor 135.

By time T3, the voltage generated by the dc/dc converter has dropped below an undervoltage level 640. In some implementations, undervoltage level 640 can be remain the same in both active discharge mode and in other (e.g., operational) modes. The same functionality can be relied upon and no additional components or modification of the dc/dc converter are needed.

After the voltage generated by the dc/dc converter has fallen below the undervoltage level 640 at T3, the gate-to-emitter voltage of the IGBT, i.e., waveform 630, is pulsed with a series of pulses 635 that each only suffice to bias IGBT 245 into conduction with a limited transconductance. The voltage across DC link capacitor 135, i.e., waveform 625, discharges. Subsequently, at time T4, the voltage across DC link capacitor 135 has fallen to a sufficiently low level that active discharge using pulses 635 can be ended. Controller 145 signals the end of active discharge mode, e.g., by transitioning waveform 605 into a low state.

After the active discharge mode has come to an end, the vehicle can, e.g., shut down completely or even restart operations. For example, to shut down, the bridge controller can allow operation of the transistor bridge to come to an end. In general, the voltage across DC link capacitor 135 can continue to fall over time due to power consumption by other components. Alternatively, to restart, bridge controller can resume operating the bridge as a full bridge.

As discussed above, waveforms 605, 610, 615, 620, 625, 630 only span a short window during and shortly after shut down or a response to a sufficiently severe fault condition.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific example voltages, currents, frequencies, power range values, times, etc., are provided for explanation purposes and that other values may also be employed in other embodiments and examples in accordance with the teachings of the present invention. For example, rather than controlling the impedance output characteristic of power switch in an inverter, the impedance output characteristic of a power switch in a dc/dc converter that is connected to rails 110, 115 can be controlled and used to discharge DC-link capacitor 135. Such a dc/dc converter can be used to supply power to other components in the vehicle.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

Although the present invention is defined in the claims, it should be understood that the present invention can alternatively be defined in accordance with the following examples.

Example 1. An electric drive system for a vehicle, the electric drive system comprising: an inverter having at least one phase leg, wherein a first of the phase legs includes a first power switch; a dc/dc converter configured to generate an internal supply voltage that is regulated with respect to a voltage on a rail configured to be coupled to a dc power supply, wherein the dc/dc converter is configured to generate the internal supply voltage to have either a relatively high voltage difference with respect to the voltage on the rail or a relatively lower voltage difference with respect to the voltage on the rail; and a gate drive channel configured to drive the first power switch into conductance by applying a relatively high voltage difference derived from the internal supply voltage during operation of the vehicle and to continue the driving of the first power switch with a relatively lower voltage difference derived from the internal supply voltage after a signal indicating shut-down or fault of the vehicle.

Example 2. The electric drive system of example 1, wherein the dc/dc converter comprises: a transistor bridge; and a bridge controller coupled to receive a discharge command and, in response, configured switch from driving the transistor bridge as a full bridge to driving the transistor bridge as a half bridge.

Example 3. The electric drive system of example 1 or 2, wherein the gate drive channel is configured to pulse the first power switch after the signal indicating the shut-down or the fault of the vehicle.

Example 4. The electric drive system of example 3, wherein the gate drive channel is configured to pulse the first power switch for a time window defined with respect to a time needed to discharge a capacitance coupled across the phase legs of the inverter.

Example 5. The electric drive system of any one of examples 1 to 4, wherein the dc/dc converter further comprises: a capacitor; and a transformer with an input winding and an output winding, wherein the capacitor is coupled to the input winding of the transformer.

Example 6. The electric drive system of one of examples 1 to 5, wherein: the first of the phase legs comprises a second power switch; and the gate drive channel is further configured to drive the second power switch for the time window.

Example 7. The electric drive system of example 6, wherein the gate drive channel is configured to drive the second power switch with a higher transconductance than a transconductance of the first power switch for the time window.

Example 8. A vehicle comprising the electric drive system of any one of examples 1 to 7.

Example 9. A control system configured to control a power switch that comprises a first terminal, a second terminal, and a control terminal, wherein conductance between the first and second terminals of the power switch is responsive to a difference between a voltage on the control terminal and a voltage on the second terminal, wherein the control system comprises: a supply capacitor coupled between a positive rail and a negative rail of the control system; a dc/dc converter configured to detect a discharge command in the control system, wherein the discharge command initiates active discharge of the supply capacitor, the dc/dc converter configured switch from generating an internal supply voltage with a relatively higher voltage difference to generating the supply voltage with a relatively lower voltage difference, wherein the dc/dc converter is configured to output a signal indicative of the internal supply voltage falling below a threshold; and a switch controller coupled to receive the signal indicative of the internal supply voltage falling below a threshold, wherein the switch controller is configured to control the difference between the voltage on the control terminal and the voltage on the second terminal based on the supply voltage with a relatively lower voltage difference in response to the signal indicative of the internal supply voltage falling below the threshold.

Example 10. The control system of example 9, wherein the dc/dc converter comprises: a transistor bridge; and a bridge controller coupled to receive the discharge command and, in response, configured switch from driving the transistor bridge as a full bridge to driving the transistor bridge as a half bridge.

Example 11. The control system of one of examples 9 to 10, wherein the discharge command is a shut-down command.

Example 12. The control system of one of examples 9-11, wherein the switch controller is configured to receive a high level command and convert the high level command into a switching pattern for controlling the difference between the voltage on the control terminal and the voltage on the second terminal.

Example 13. The control system of one of examples 9-12, wherein the dc/dc converter is configured to output an undervoltage signal to indicate the internal supply voltage falling below the threshold.

Example 14. The control system of one of examples 9-13, wherein the power switch is part of a phase leg of an inverter that has a plurality of phase legs.

Example 15. A vehicle comprising the control system of any of examples 9 to 14.

What is claimed is:

1. An electric drive system for a vehicle, the electric drive system comprising:
   an inverter having at least one phase leg, wherein a first of the at least one phase leg includes a first power switch;
   a dc/dc converter configured to generate an internal supply voltage that is regulated with respect to a voltage on a rail configured to be coupled to a dc power supply, wherein the dc/dc converter is configured to generate the internal supply voltage to have either a relatively high voltage difference with respect to the voltage on the rail or a relatively lower voltage difference with respect to the voltage on the rail in response to a discharge command; and
   a gate drive channel configured to drive the first power switch into conductance by applying a relatively high voltage difference derived from the internal supply voltage during operation of the vehicle and to continue the driving of the first power switch with a relatively lower voltage difference derived from the internal supply voltage after a signal indicating shut-down or fault of the vehicle.

2. The electric drive system of claim 1, wherein the dc/dc converter comprises:
   a transistor bridge; and
   a bridge controller coupled to receive the discharge command and, in response, configured to switch from driving the transistor bridge as a full bridge to driving the transistor bridge as a half bridge.

3. The electric drive system of claim 1, wherein the gate drive channel is configured to pulse the first power switch after the signal indicating the shut-down or the fault of the vehicle.

4. The electric drive system of claim 3, wherein the gate drive channel is configured to pulse the first power switch for a time duration defined with respect to a time needed to discharge a capacitance coupled across the at least one phase leg of the inverter.

5. The electric drive system of claim 3, wherein the gate drive channel comprises gate drive circuitry having desaturation protection circuitry, wherein the desaturation protection circuitry specifies when conduction of the first power switch is to end during the pulsing.

6. The electric drive system of claim 1, wherein the dc/dc converter further comprises:

a capacitor; and a transformer with an input winding and an output winding, wherein the capacitor is coupled to the input winding of the transformer.

7. The electric drive system of claim 1, wherein:

the first of the at least one phase leg comprises a second power switch; and the gate drive channel is further configured to drive the second power switch for a time duration.

8. The electric drive system of claim 7, wherein the gate drive channel is configured to drive the second power switch with a higher transconductance than a transconductance of the first power switch for the time duration.

9. The electric drive system of claim 1, wherein the electric drive system is housed in a vehicle.

10. A control system configured to control a power switch that comprises a first terminal, a second terminal, and a control terminal, wherein conductance between the first and second terminals of the power switch is responsive to a difference between a voltage on the control terminal and a voltage on the second terminal, wherein the control system comprises:

a supply capacitor coupled between a positive rail and a negative rail of the control system;

a dc/dc converter configured to detect a discharge command in the control system, wherein the discharge command initiates active discharge of the supply capacitor, the dc/dc converter configured to switch from generating an internal supply voltage with a relatively higher voltage difference to generating the supply voltage with a relatively lower voltage difference, wherein the dc/dc converter is configured to output a signal indicative of the internal supply voltage falling below a threshold; and a switch controller coupled to receive the signal indicative of the internal supply voltage falling below a threshold, wherein the switch controller is configured to control the difference between the voltage on the control terminal and the voltage on the second terminal based on the supply voltage with a relatively lower voltage difference in response to the signal indicative of the internal supply voltage falling below the threshold.

11. The control system of claim 10, wherein the dc/dc converter comprises:

a transistor bridge; and a bridge controller coupled to receive the discharge command and, in response, configured to switch from driving the transistor bridge as a full bridge to driving the transistor bridge as a half bridge.

12. The control system of claim 10, wherein the discharge command is a shut-down command.

13. The control system of claim 10, wherein the switch controller is configured to receive a high level command and convert the high level command into a switching pattern for controlling the difference between the voltage on the control terminal and the voltage on the second terminal.

14. The control system of claim 10, wherein the switch controller comprises gate drive circuitry having desaturation protection circuitry, wherein the desaturation protection circuitry specifies when conduction of the power switch is to end during the active discharge.

15. The control system of claim 10, wherein the dc/dc converter is configured to output an undervoltage signal to indicate the internal supply voltage falling below the threshold.

16. The control system of claim 10, wherein the power switch is part of a phase leg of an inverter that has a plurality of phase legs.

17. The control system of claim 10, wherein the control system is housed in a vehicle.

* * * * *